United States Patent

[11] 3,630,633

[72] Inventor Thomas R. Stockton
 Ann Arbor, Mich.
[21] Appl. No. 35,372
[22] Filed May 7, 1970
[45] Patented Dec. 28, 1971
[73] Assignee Ford Motor Company
 Dearborn, Mich.

[54] GAS TURBINE ENGINE NOZZLE ACTUATION SYSTEM
 5 Claims, 5 Drawing Figs.

[52] U.S. Cl. .......................................................... 415/150,
 415/32
[51] Int. Cl. ....................................................... F04d 27/00,
 F04d 27/02
[50] Field of Search .......................................... 415/32, 33,
 44, 24, 147, 149, 150, 159; 60/39.17, 39.29

[56] References Cited
 UNITED STATES PATENTS

| | | | |
|---|---|---|---|
| 2,412,365 | 12/1946 | Sollinger ...................... | 415/150 |
| 2,746,713 | 5/1956 | Peyrin et al. .................. | 415/150 |
| 2,988,327 | 6/1961 | Throwbridge et al. ......... | 415/44 |
| 3,064,942 | 11/1962 | Martin .......................... | 415/32 |
| 3,099,433 | 7/1963 | Wagner et al. ................ | 415/149 |
| 3,211,424 | 10/1965 | Lewakowski .................. | 415/32 |

FOREIGN PATENTS

| | | | |
|---|---|---|---|
| 839,697 | 6/1960 | Great Britain ................ | 415/150 |
| 876,504 | 9/1961 | Great Britain ................ | 415/150 |
| 452,473 | 11/1948 | Canada ......................... | 415/150 |
| 1,084,493 | 7/1954 | France .......................... | 415/149 |

*Primary Examiner*—Henry F. Raduazo
*Attorneys*—John R. Faulkner and Robert E. McCollum

ABSTRACT: An actuation system includes crank arms connected to the nozzle blades for pivoting them, the crank arms being movable in an arcuate path by pure tangential forces applied by the combined axial and rotary movement of an internally mounted shaft that is moved by a pair of fluid-interconnected servos.

INVENTOR.
THOMAS R. STOCKTON
BY
John R. Faulkner
Robert E. McCollum
ATTORNEYS

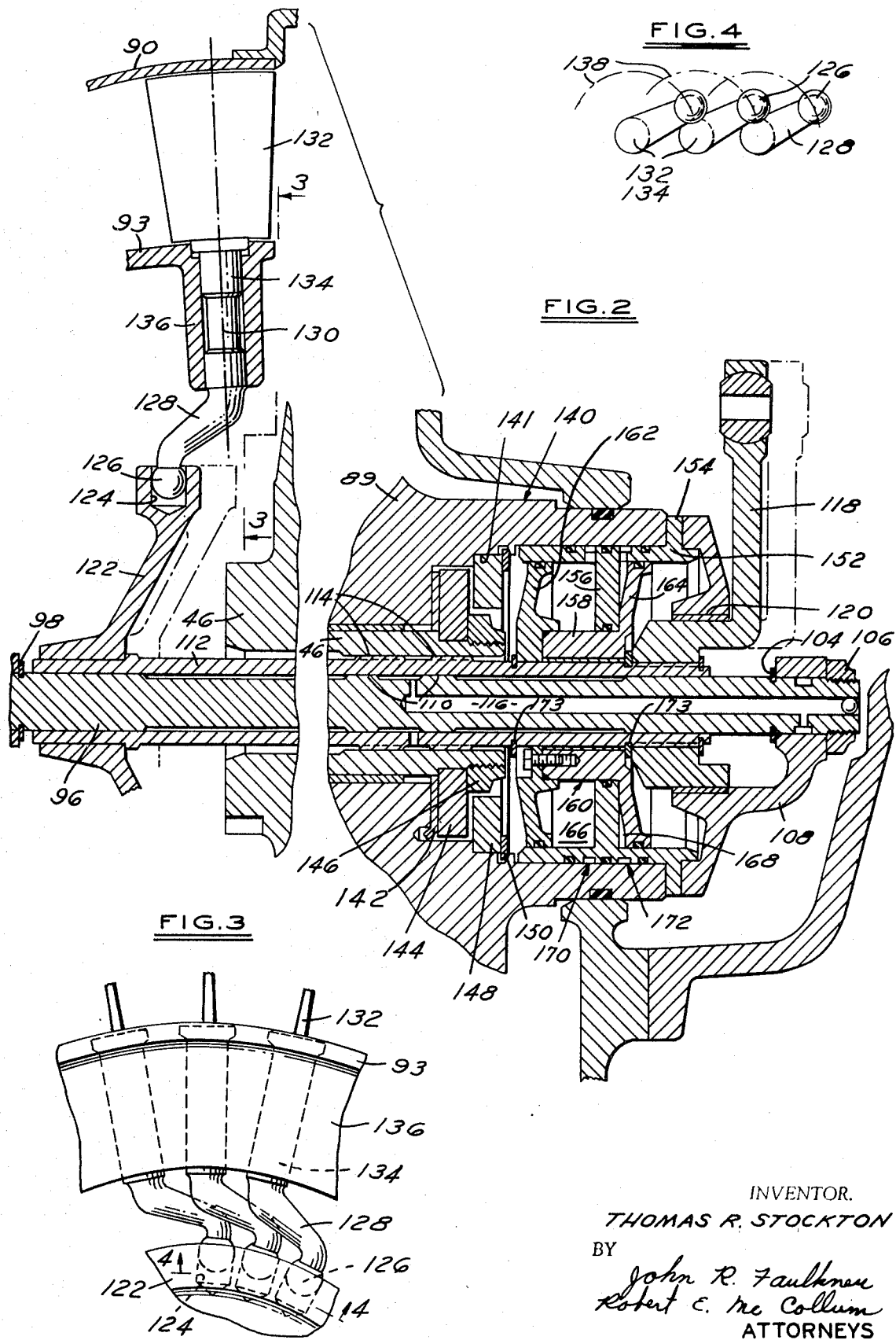

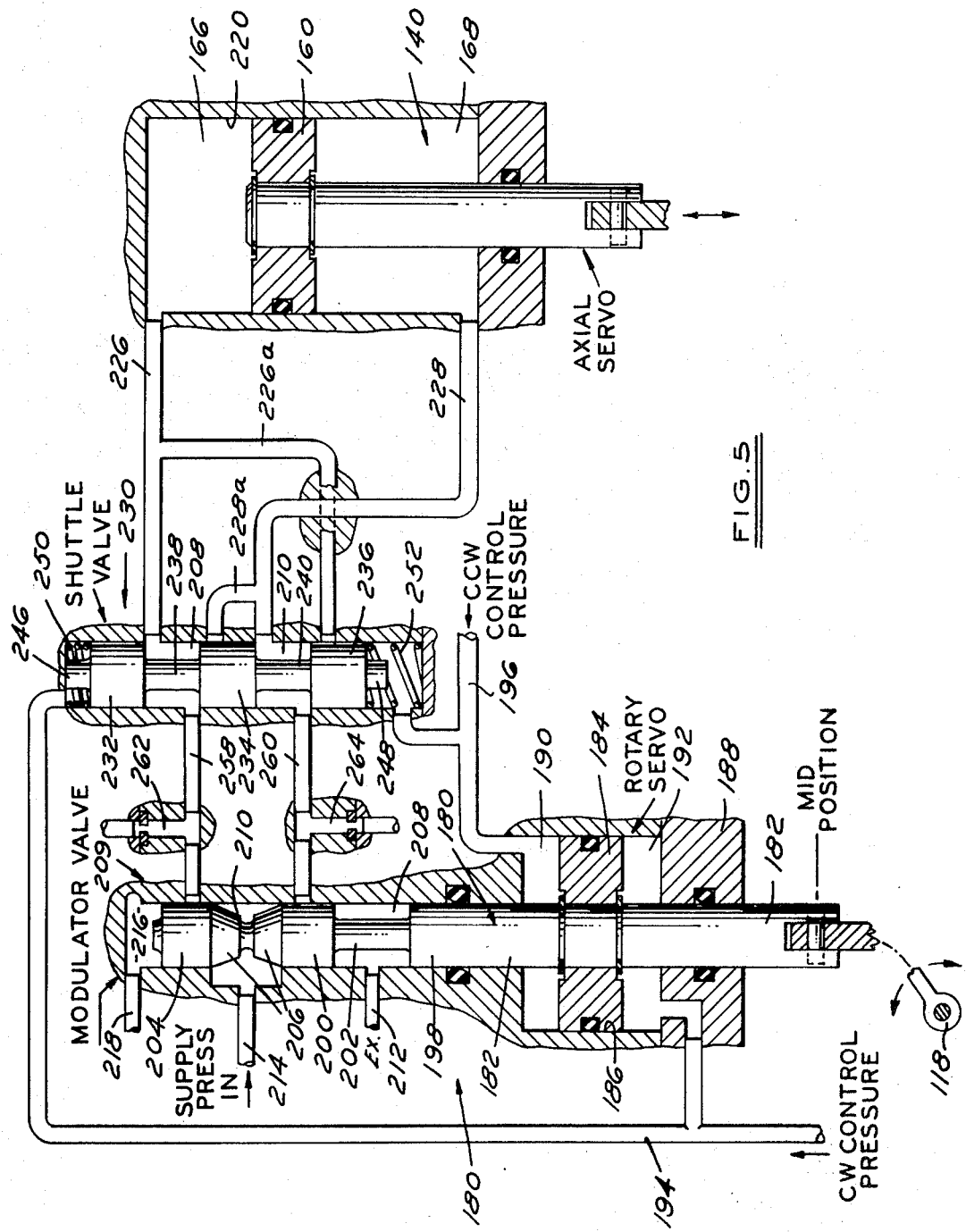

GAS TURBINE ENGINE NOZZLE ACTUATION SYSTEM

This invention relates, in general, to a gas turbine engine of the automotive type, More particularly, it relates to one having variable-position power turbine nozzles, and specifically to an internally mounted actuation system for varying the position of the nozzles.

An object of the invention is to provide a nozzle actuation system that minimizes sticking or binding of the nozzles during their movements; one that is economical to manufacture; and one that improves the engine efficiency over known actuation systems.

My U.S. Pat. No. 3,514,213 illustrates a typical power turbine nozzle actuating system for an axial flow type engine. It includes a large-diameter ring gear with sector gears secured to each of the nozzle support shafts for rotatably positioning the nozzles upon circumferential movement of the ring gear.

However, such an actuating system has many disadvantages. For example; the large-diameter parts provide a great amount of lash; one nozzle blade stopped at one angle may wind up at a different angle from the blade diametrically opposite at 180°. This provides less uniform blade control. Also, generally there is a large pressure drop across the nozzle outwardly from the gas flow path as compared to an inward pressure drop in an internally mounted actuation system. This results in less efficiency and requires a tighter sealing fit for an external system as compared to an internal one.

Additionally, an external system generally requires the use of positioning struts that extend directly through the hot flow path to support the inner blade shroud from the outer shroud. These struts occupy valuable space in the gas path, cause drag on the flow, and, therefore, provide less efficient flow. High heat resistant material also is required for the struts, which increases the overall cost of the engine.

Furthermore, an external system of the type indicated generally provides large torque forces on the nozzle during their movements since, with the prior art actuation system described, a pure tangential torque cannot be applied. This causes binding forces that increase the friction in the system, and, therefore, reduce the engine efficiency.

The actuation system of the invention eliminates the above disadvantages by providing an internally mounted nozzle actuation system in which the nozzles are moved by essentially pure tangential forces only. An internal system reduces the diameter of the actuation parts, eliminates the conventional large ring gear and sector gears, eliminates the positioning struts described above, and, in this embodiment, extends the conventional 90° blade travel practical limit to 130° or more by a combined rotary and axial servo assist.

More specifically, the invention provides an internal actuation system for a movable nozzle in which pure tangential forces are applied to the nozzles so that minimum frictional forces result. The invention accomplishes this by providing the nozzles with crank arms that are laterally offset inwardly of the nozzles and universally secured to an actuation disc. The latter is both rotatably and axially movable by a number of individual servos fluid interconnected in such a manner that when a change in the nozzle position is called for, a combined axial and rotary movement is imparted to the nozzle crank arm to assure a pure tangential force thereon.

It is a primary object of the invention, therefore, to provide a gas turbine engine nozzle actuating system that is mounted within the engine in a manner to provide the most efficient operation thereof with the smallest forces and one that senses both blade position and change in direction to generate the correct magnitude and direction of axial forces at the crank arms of the nozzle blades.

Other objects, features and advantages of the invention will become more apparent upon reference to the succeeding detailed description thereof, and to the drawings illustrating a preferred embodiment thereof, wherein:

FIG. 2 is an enlarged cross-sectional view of a portion of FIG. 1 with parts broken away and in section;

Figure 1:
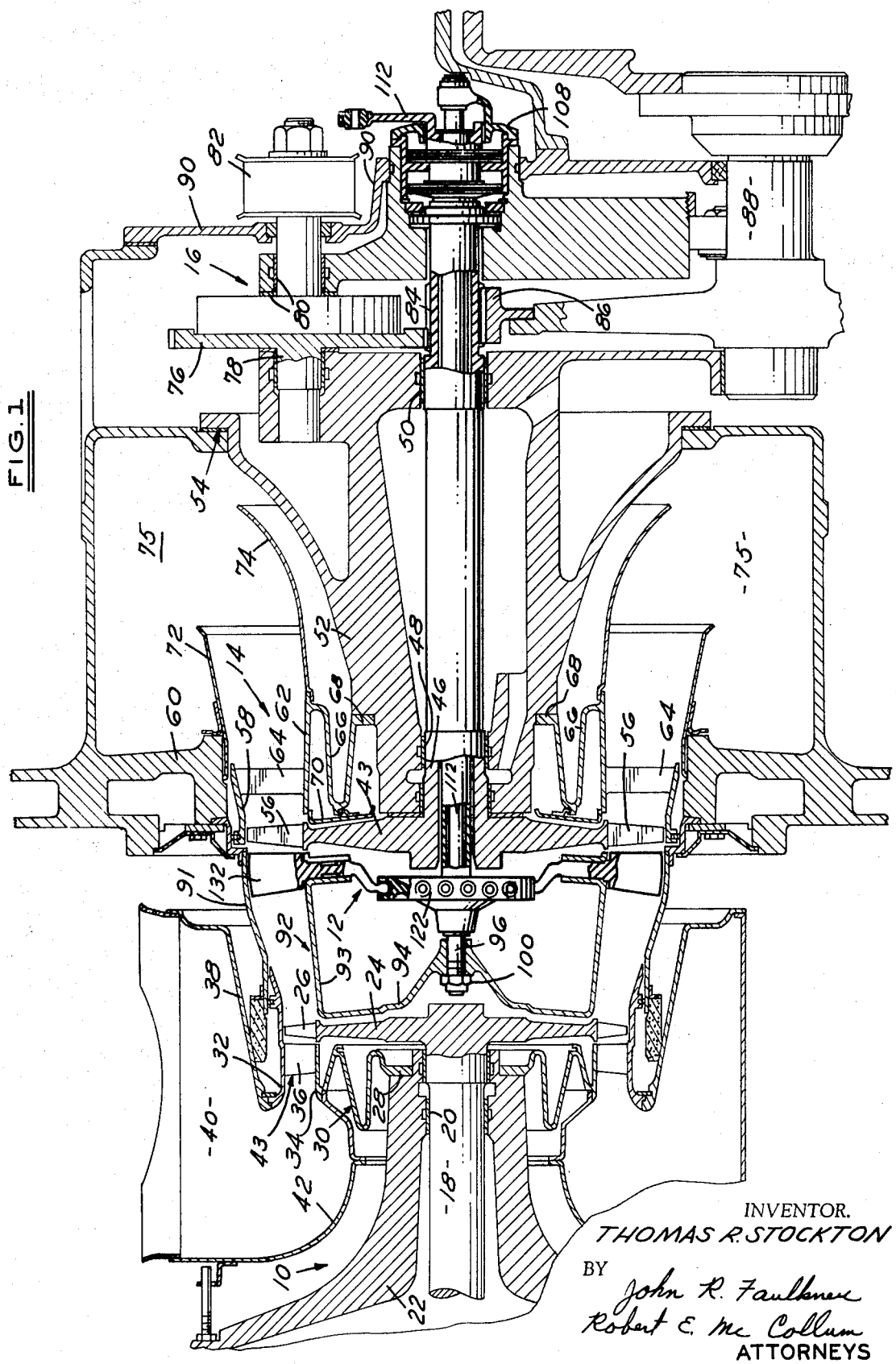
FIG. 1 is a cross-sectional view of a portion of a gas turbine engine embodying the invention.

FIGS. 3 and 4 are cross-sectional views taken along planes indicated by and viewed in the direction of the arrows 3—3 and 4—4 of FIGS. 2 and 3, respectively; and, FIG. 5 is a schematic illustration of a fluid pressure control system for controlling the position of the nozzle blades shown in FIGS. 1–4.

As stated, the invention is concerned primarily with the actuation system for the movable nozzles of a gas turbine engine. However, in order to provide a clearer understanding of such a system, FIG. 1 indicates in further lines those additional portions of a conventional gas turbine engine that are considered sufficiently related to the actuation system as to be deemed worthy of description. The specific details, however, of construction and operation of the gas turbine engine parts, other than those specifically relating to the invention, will not be given as they are known and believed to be unnecessary for an understanding of the invention.

More specifically, FIG. 1, which is essentially to scale, shows the central portion of an axial flow type gas turbine engine of the automotive vehicle type. It includes the rear portion 10 of a gasified section, a power turbine variable nozzle section 12, a power turbine section 14 and a reduction gear train section 16.

The gasifier section 10 includes the usual compressor, not shown, fixedly secured on one end of a compressor turbine rotor shaft 18. The latter is rotatably mounted by sleeve bearings 20 in a conicallike support member 22. The support member is fixed in any suitable manner, not shown, to the front main engine housing, also not shown. Shaft 18 is integrally formed or otherwise fixed to a turbine wheel 24 on which are mounted a number of circumferentially spaced blades 26.

Positioned against the axially inner end of support 22 is the inner radial end 28 of a turbine shroud support member 30. The latter has a thin cross section and a zigzagged configuration of a length that will dissipate the heat of the hot gases before they can reach the bearing surface 20.

Support member 30 is of a one-piece stationary construction that includes an outer annular shroud part 32 separated from an inner annular section 34 by a number of circumferentially spaced nozzle blades 36. The axially inner part of outer shroud 32 lies closely adjacent the tips of rotor blades 26. The forward end of shroud 32 mates with the lower portion 38 of a wall of a plenum 40.

Plenum 40 is further defined by a portion 42 that is connected to the gasifier rotor shaft support 22 in the manner shown. It also acts as a heat-insulating shield to protect the rotor shaft bearing 20 from the hot motive gases. The plenum chamber would be connected at its upper end to the discharge end of the engine combustion or burner can, not shown. The lower portion of the plenum is faired to cooperate in a streamlined manner with the tapered inlet to the gas flow path 43 defined between inner and outer shrouds 32 and 34.

The power turbine section 14 is of the axial flow type. It includes a power turbine wheel 44 formed integrally with or otherwise secured to a sleeve shaft 46 that extends longitudinally through the rear portion of the engine. It is rotatably supported by annular bearings 48 and 50 on a conicallike support member 52. The support member is bolted or otherwise secured to the outer engine housing at 54, as shown.

The turbine wheel 44 has fixed to it at its outer periphery a number of circumferentially spaced turbine blades 56. The latter have a running clearance within a stationary annular outer shroud member 58 that is sealingly supported within an extension 60 of the outer annular housing.

Outer shroud 58 is part of a one-piece construction similar to the gasifier shroud support 30. Outer shroud 58 is integrally fixed to an inner annular shroud 62 by a number of circumferentially spaced struts 64, inner shroud 62 forming one wall of the hot gas flow path. The inner shroud has a tin cross-sectional support web 66 secured to its radially inner end 68 against a shoulder on the power turbine conical support member 52. An annular heat shield 70 is fixed to web 66 to protect the bearing portions 48 against the hot motive fluid flow.

The downstream diffuser portion of the gas flow path is defined by an outer annular guide member 72 secured to inner housing partition 60, and an inner guide 74 secured to the inner shroud 62. The gas flow is discharged into an annular chamber 75 leading to an engine regenerator, not shown.

The rear portion of power turbine support member 52 is formed as a shaft support for a portion of the reduction gear train 16. More specifically, the gear train includes a gear 76 having a shaft 78 rotatably mounted on bearing members 80 in the support 52 extension. The shaft 78 has an extension on which is mounted a power takeoff pulley 82 for driving accessories, etc. Gear 76, in this case, is driven by a sun gear 84 fixed on the power turbine shaft 46. Sun gear 84 in turn drives a large or ring or final reduction gear 86 that is fixed to the engine output shaft 88 for driving the vehicle transmission input shaft, not shown.

The power turbine support structure also includes a further portion 89 mounted within the rear portion 90 of the main housing, as shown, and, as will be described, contains the servomechanism for the turbine nozzle actuating system.

The central nozzle assembly 12 includes an outer shroud 91 supported at one end by housing portion 60 and at its other end by engagement with the gasifier outer shroud 32. The power turbine nozzle inner shroud 92 includes an axial wall 93 and a radially inwardly extending wall portion 94. The inner wall is fixedly secured to a central shaft 96 between a snapring 98 (FIG. 2) and a locating nut 100. As best seen in FIG. 2, the opposite end of shaft 96 is axially located between a snapring 104 and a nut 106 within an annular support member 108.

A sleeve shaft 112 is rotatably mounted with respect to stationary shaft 96 by spaced bearing pads 110. The sleeve shaft in turn is spaced radially within power turbine shaft 46 by a pair of labyrinthian seals 114. The latter are axially spaced and pressurized outwardly from the midpoint between by connection thereof to a source of air pressure in a central bore 116. The bore is connected to any suitable source of air under pressure, such as a tap from the compressor, not shown, to maintain the space rearwardly of the labyrinthian seals free of hot motive gas that may find its way between the two shafts 46 and 112.

Sleeve shaft 112 is splined at its rearward end to a rotary servo lever 118. The latter is mounted for rotation on outer annular bearing surface 120 within stationary support 108. At its forward end, sleeve shaft 112 has a disc 122 secured to it having a number of equally circumferentially space sockets or openings 124 in the outer peripheral edge. Located in each of the sockets 124 is the spherical end 126 of a nozzle blade crank arm 128 that is offset laterally from the axis of rotation 130 of the variable-power turbine nozzle blades 132.

Nozzle blades 132 are formed integrally with a straight section 134 of the crank arm 128, the straight section being rotatably mounted within a sleevelike extension 136 of inner shroud wall 93. The close radial tolerance between the outer periphery of the nozzle blade elements 132 and the inner diameter of outer shroud portion 90 radially locates the inner shroud assembly and nozzle assembly at the forward end.

As best seen in FIG. 4, the spherical ends 126 of each crank arm move approximately 130° in an arcuate path 138 to variably change the position or attitude of the nozzle blades 132. Accordingly, it will be clear that the control disc 122 and the sleeve shaft 112 should move axially simultaneously with the circumferential movement of the control disc and shaft 112 in order to pivot the blades by pure tangential forces to eliminate binding forces. The servomechanism for accomplishing this is partially shown to the right of FIG. 1, in more detail in FIG. 2, and schematically in FIG. 5.

The space between the rearward end of turbine rotor shaft 46 and the end of sleeve shaft 112 is recessed to provide an axial power piston assembly 140. More specifically, the rearward portion 89 of the reduction gear train support has a stepped diameter internal portion 141 containing a pair of thrust washers 142 locating a disc or washer 144. The latter is fixed to the end of the power turbine shaft 46 by a nut 146 and locates a second washer 148 against a stop ring 150.

The power servo 140 includes an outer annular portion 152 axially located by a radial projection 154 between the stationary reduction gear train support member 89 and the support 108. It includes a partition member 156 sealingly and slidably receiving within it the hub 158 of a two-piece slidable piston 160. The piston has essentially a U-shape in cross section with each leg 162 and 164 together with the stationary partition 156 defining separate fluid chambers 166 and 168.

Fluid pressure to the respective chambers 166 or 168 is admitted through individual ports 170 and 172 from a suitable selector valve, such as is shown in FIG. 5, to be described. The two portions 162 and 164 of the servo are secured axially to the sleeve shaft 112 between a pair of snaprings 173 so as to cause axial movement of the sleeve shaft upon admission of fluid under pressure to either of the chambers 166 and 168. Sleeve shaft 112 also is rotated by circumferential movement of the rotary servo lever 118, in a manner to be described.

As thus far described, therefore, it will be seen that when it is desired to change the attitude or position of the variable nozzle blades 132, it will be desirable to simultaneously move the sleeve shaft 112 axially as well as rotate the shaft. The combined movement of the shaft will then follow the path 138 of the crank arm ends 126, and, therefore, provide pure tangential force components moving the crank arms so as not to introduce side forces that would cause a binding of the end of the crank arms in the slots 124 and reduce the efficiency of operation. This combined axial and rotary movement is provided by a pair of servos, to be described in connection with FIG. 5; fluid being admitted to the rotary servo to rotate the servo lever 118 at the same time that fluid is admitted to one or the other of chambers 166 or 168 to axially move shaft 112.

More specifically, the rotary servo lever 118 shown in FIG. 1 is indicated at the bottom of FIG. 5 as being connected to a combination piston and spool valve member 180. The latter consists of a shaft 182 having a piston member 184 slidably movable within a recess 186 defined within a valve body 188. The piston divides the recess into two fluid chambers 190 and 192 each of which is connected to a different and separate source of fluid under pressure in lines 194 and 196. No particular sources are shown although it will be clear that any suitable sources of fluid under pressure may be used.

The opposite end of shaft 182 is formed as a combination spool valve and modulator valve, It has lands 198 and 200 connected by a neck portion 202 of reduced diameter, and a land 204 connected to land 200 by a conically shaped, variable pressure controlling neck portion 206. The two neck portions 202 and 206 form with the valve body fluid annuli 208 and 210. The annulus 208 is vented through a line 212 to the inlet side of the source of fluid pressure, while the annulus 210 is connected to an independent source of fluid under pressure in a line 214. The valve land 204 forms with the end of the valve body a chamber 216 that is vented to the intake of the fluid pressure supply through a line 218.

The axial servo assembly 140 shown in FIG. 1 is indicated schematically in FIG. 5 as having a piston member 160. It is slidable and sealingly mounted within a recess 220 in the valve body, the piston-defining fluid pressure chambers 166 and 168 on opposite sides thereof. The two chambers are connected via lines 226 and 228, respectively, to opposite sides of the modulator valve 209 through a shuttle valve indicated at 230.

The shuttle valve 230 is of the spool type having three lands 232, 234 and 236 interconnected by neck portions 238 and 240 of reduced diameter. The neck portions provide fluid annuli 242 and 244. Annulus 242 is connected to the servo line 226, while annulus 244 is connected to servo line 228. The servo lines 226 and 228 are provided further with branches 226a and 228a, for a purpose to be described.

The opposite ends of the shuttle valve 230 are provided with stem portions 246 and 248 cooperating with the ends of the valve bore to provide fluid annuli 250 and 252 connected respectively to the fluid pressure supply lines 194 and 196. Springs 254 and 256 center the valve when no fluid pressure or equal fluid pressure is in opposite annuli 250 or 252.

Completing the construction, the annuli 242 and 244 are connected to the modulator valve 209 by further lines 258 and 260, each of which contains an orifice vent line branch 262 and 264, respectively.

In operation of the control system, selection of the position or attitude of the turbine nozzle blades generally is made automatically and instantaneously by a control system (not shown) of the type shown, for example, in U.S. Pat. No. 3,508,395. For example, if the turbine output temperature should exceed the design level desired, fluid would automatically and instantaneously be scheduled according to the control system of U.S. Pat. No. 3,508,395 to one or the other sides of both of the rotary and axial servos shown in FIG. 5 to axially and rotatably move the sleeve shaft 112 to position the nozzle blades 132 toward a braking attitude. On the other hand, during acceleration of the engine, the speed signal control and position of the fuel demand lever in U.S. Pat. No. 3,508,395 will automatically determine which fluid pressure line 194 or 196 should receive fluid so as to properly position the nozzle blades 132. In actual practice, the pistons 184 and 160 will hunt continuously back and forth since the nozzle blades generally are continuously moving in an attempt to satisfy the control system requirements.

With the parts positioned as shown in FIG. 5, the blades 132 are located in a mid position. Fluid flow to and from the servo chambers is blocked, for example, for chambers 166 and 168 of the axial servo by the lands 204 and 200 of the modulator valve and the lands of the centered shuttle valve 230. Assume now that a signal is received that the position of the blades should be changed. Assume that the blades are to be rotated in a counterclockwise direction, Accordingly, a control pressure will be supplied to line 196 which acts to immediately move the shuttle valve 230 upwardly to the position shown and immediately begins moving the servo piston 184 downwardly. This will move the modulator valve land 200 to connect lines 214 and 260 to immediately supply pressure to the axial servo chamber 168. This will move sleeve shaft 112 in the appropriate direction simultaneously with the rotation of the shaft by the movement of the rotor servo lever 118. The line 194 at this time is empty of fluid under pressure.

As soon as the control system receives a feedback signal from the rotary movement of the nozzle blades 132, for example, the supply of fluid to line 196 will be cut off. The centering springs on opposite ends of the shuttle valve 230 then will center the shuttle valve and cut off the supply of fluid to and drain of the fluid from the chambers 166 and 168 for the axial servo. While the modulator valve 209 may be in a position to still supply fluid to one or the other of the lines 258 or 260, this will not pass the shuttle valve and will drain slowly through the orifice branch 262 or 264.

When a signal again is received to move the nozzle blades in either direction, fluid under pressure will be supplied, for example, to line 194, at which time pressure in chamber 192 will move the piston 184 upwardly as seen in FIG. 5. This immediately moves the shuttle valve 230 down against the centering spring to connect the supply pressure in line 214 through the appropriate line 258 or 260 as a function of the position of valve 209. As the valve moves through the center position, for example, the switch of line 214 from a connection with line 260 to line 258 will cause a switch in fluid pressure to the opposite chamber 166 or 168 of the axial servo. Accordingly, it will be seen that both the axial and rotary servos will be moved essentially simultaneously so that the combined force on the spherical portion of the crank arm of the nozzle blade is acted upon by a tangential force or force that is tangential to the arcuate path of movement of the spherical portion 118 so that no binding forces are apparent. The switch from an axial force in one direction to one in the opposite direction as the crank arms 126 pass over center will be made automatically, as described.

In operation of the gas turbine engine as a while, air discharged from the compressor passes through one side of the conventional regenerator, not shown, and into the combustion can to which fuel is added. The products of combustion then pass into the plenum 40 from which they exit into the gas flow path 43 defined by the inner and outer shrouds 32, 34. This drives the compressor turbine 24 and passes through the movable nozzles 132 against the power turbine blades 46 to drive the power turbine and reduction gear train and ultimately the output shaft 88. A positioning of the turbine nozzles 132 to obtain the best acceleration, or braking, or cruising attitude, etc., as the case may be, will be determined by the admission of fluid under pressure alternately to the control lines 194 or 196 in FIG. 5 as determined by the control signal from the gas turbine engine control system. The nozzles will be essentially continuously moving to different positions in an attempt to maintain the engine operating according to design.

From the above, it will be clear that the invention provides a nozzle-actuating system that is relatively simple in construction and operation and yet provides the degree of control of the nozzle position desired without necessary frictional and drag forces on the actuator members.

I claim:

1. A variable nozzle assembly for a gas turbine engine comprising, in combination, a plurality of pivotally mounted circumferentially arranged blades each having a crank arm depending therefrom with a portion that extends laterally from the pivot axis of the associated blade for movement of the ends of said arms in an arcuate path to position said blades, longitudinally extending movable force-transmitting means positioned internally of said arms and universally connected thereto for moving said arms along said path by essentially pure tangential forces, and a plurality of servo means operatively connected to said force-transmitting means in a manner simultaneously rotating and axially moving said force-transmitting means at times to move said arms along said path.

2. An assembly as in claim 1, including means mounting said force-transmitting means for both an axial sliding movement and a rotatable movement, said servo means including a first servo connected to said force-transmitting means to rotate the same, and a second servo connected to said force-transmitting means for axially moving the same.

3. An assembly as in claim 2, including control means operatively connected to said first and second servos effecting simultaneous movement thereof.

4. An assembly as in claim 2, including a control arm fixed to said force-transmitting means and extending radially therefrom, said second servo being operatively connected to said control arm for rotational movement of said arm and force-transmitting means.

5. An assembly as in claim 1, including disclike means interconnecting said force-transmitting means and crank arms, said disc means having individual sockets in the peripheral edge rotatably receiving the ends of the individual crank arms therein.

* * * * *